United States Patent
Erzler et al.

(10) Patent No.: US 12,521,735 B2
(45) Date of Patent: Jan. 13, 2026

(54) HYDRO-CYCLONE SYSTEM

(71) Applicant: Voith Patent GmbH, Heidenheim (DE)

(72) Inventors: Axel Erzler, Elchingen Thalfingen (DE); Thomas Jaschek, Bergatreute (DE)

(73) Assignee: Voith Patent GmbH, Heidenheim (DE)

( * ) Notice: Subject to any disclaimer, the term of this patent is extended or adjusted under 35 U.S.C. 154(b) by 546 days.

(21) Appl. No.: 17/967,493

(22) Filed: Oct. 17, 2022

(65) Prior Publication Data
US 2023/0037357 A1 Feb. 9, 2023

Related U.S. Application Data

(63) Continuation of application No. PCT/EP2021/059210, filed on Apr. 8, 2021.

(30) Foreign Application Priority Data

Apr. 17, 2020 (DE) ............ 10 2020 110 467.7

(51) Int. Cl.
*B04C 5/28* (2006.01)
*B04C 5/04* (2006.01)
(Continued)

(52) U.S. Cl.
CPC ............ *B04C 5/28* (2013.01); *B04C 5/04* (2013.01); *B04C 5/18* (2013.01); *B04C 5/23* (2013.01); *D21D 5/24* (2013.01)

(58) Field of Classification Search
CPC ........ B01D 19/0057; B04C 5/28; B04C 5/02; B04C 5/14; B04C 5/18; B04C 5/13; B04C 5/23; B04C 5/06; B04C 3/06; B04C 5/26
See application file for complete search history.

(56) References Cited

U.S. PATENT DOCUMENTS 3,237,763 A    3/1966  Wikdahl
5,221,476 A *  6/1993  Papetti .................... D21D 5/24
                                              209/931
(Continued)

FOREIGN PATENT DOCUMENTS

DE           201 13 114 U1      4/2003
DE       10 2013 209 998 A1     5/2014
EP            0 037 278 A2     10/1981

OTHER PUBLICATIONS

Notification of the Transmission of the International Search Report and Written Opinion of the International Search Authority or Declaration dated Jul. 14, 2021 for International Application No. PCT/EP2021/059210 (10 pages).

*Primary Examiner* — Pranav N Patel
(74) *Attorney, Agent, or Firm* — TAYLOR & EDELSTEIN, PC

(57) ABSTRACT

A system for purifying a fibrous suspension consists of multiple hydro-cyclones arranged adjacent to one another in a row, each of the hydro-cyclones having at least one feed connection, one accepted stock connection and one reject material connection, and having at least one supply manifold which is connected to multiple feed connections and/or having at least one accepted stock manifold which is connected to multiple accepted stock connections and/or having at least one reject material manifold which is connected to multiple reject material connections, the manifold being elongated and the corresponding connections discharge at their longitudinal side into the corresponding manifold. At an end of at least one manifold which follows the final hydro-cyclone, a fluid or a suspension is guided via at least one flushing connection into or out of the manifold.

15 Claims, 1 Drawing Sheet

(51) Int. Cl.
*B04C 5/18* (2006.01)
*B04C 5/23* (2006.01)
*D21D 5/24* (2006.01)

(56) References Cited

U.S. PATENT DOCUMENTS 7,141,139 B2 11/2006 Meinander et al.
2003/0159785 A1* 8/2003 Meinander ............... D21D 5/24
162/55

* cited by examiner

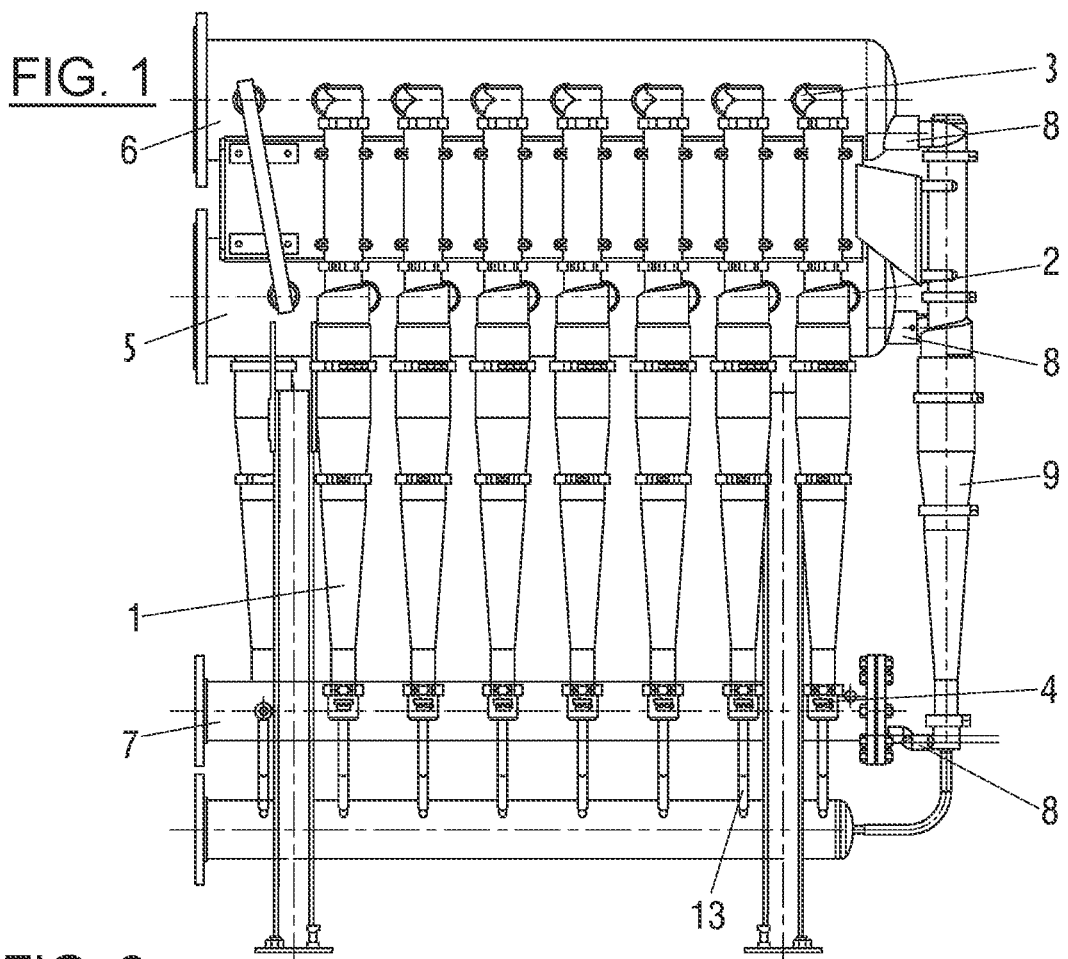
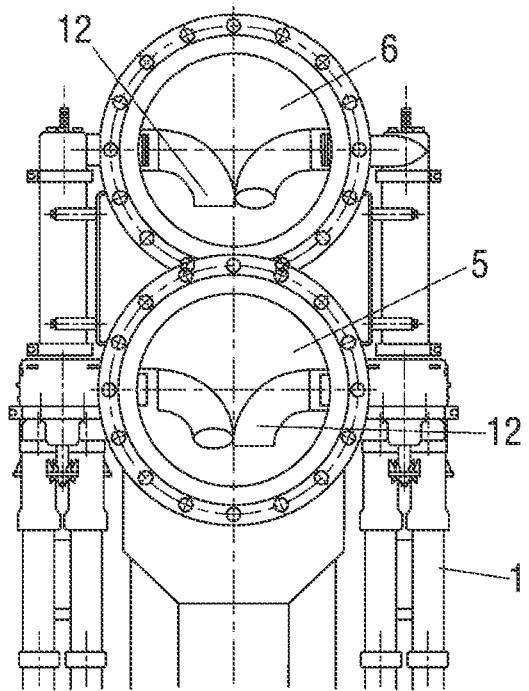
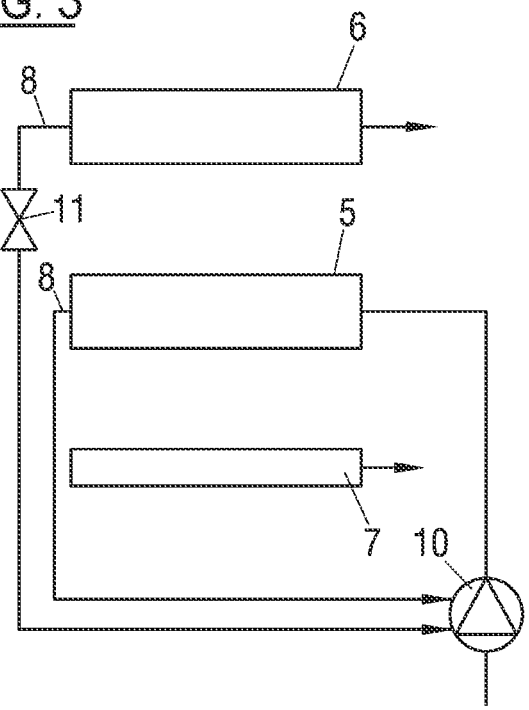

HYDRO-CYCLONE SYSTEM

CROSS REFERENCE TO RELATED APPLICATIONS

This is a continuation of International Patent Application No. PCT/EP2021/059210 entitled "HYDROCYCLONE INSTALLATION" filed on Apr. 8, 2021, which is incorporated in its entirety herein by reference. International Patent Application No. PCT/EP2021/059210 claims priority to German Patent Application No. DE 10 2020 110 467.7 filed on Apr. 17, 2020, which is incorporated in its entirety herein by reference.

BACKGROUND OF THE INVENTION

1. Field of the Invention

The invention relates to a system for purifying a fibrous suspension consisting of multiple hydro-cyclones.

2. Description of the Related Art

Hydro-cyclones are well suited for concentrating heavy and light particles in pulp suspensions by centrifugal forces and discharging them via the outlet or separator.

As a rule, they are used to remove small metal particles, glass splinters and sand, or polystyrene and other light plastic particles.

Hydro-cyclone systems frequently also serve to remove at least a large part of gases, for example air, contained in the fluid. For this purpose, the accepted stock is placed under negative pressure after leaving the hydro-cyclone so that the gases can escape and be removed separately.

These processes are known in principle, as is the fact that a good effect is only ensured if the hydro-cyclones do not exceed a certain size.

Thus, in a hydro-cyclone system designed for larger throughput volumes, a multitude—often even a plurality—of hydro-cyclones is required. The fluid to be purified then flows through these in parallel, which means that the fluid flow must be divided into a multitude of smaller partial flows. While the fibrous suspension is fed from a supply manifold, the accepted stock and reject material flows coming from the hydro-cyclones are combined in accepted stock manifolds and rejects manifolds. As a rule, these tubular manifolds are closed on one side, often leading to dead zones and thus to deposits in the region of the closed end of the manifold.

What is needed in the art is a way to counteract the deposits in a manifold.

SUMMARY OF THE INVENTION

In some exemplary embodiments provided according to the invention, A system for purifying a fibrous suspension consists of: multiple hydro-cyclones, arranged adjacent to one another in a row, each of the hydro-cyclones having at least one feed connection, one accepted stock connection and one reject material connection, and having at least one supply manifold which is connected to multiple feed connections for the purpose of feeding the fibrous suspension and/or having at least one accepted stock manifold which is connected to multiple accepted stock connections which serves to drain the accepted stock and/or having at least one reject material manifold which is connected to multiple reject material connections which serves to discharge reject material. The corresponding at least one manifold is elongated and the corresponding connections discharge at their longitudinal side into the corresponding at least one manifold. At an end of the corresponding at least one manifold which follows the final hydro-cyclone, a fluid or a suspension is guided via at least one flushing connection into or out of the corresponding at least one manifold.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 illustrates a side view of an exemplary embodiment of a hydro-cyclone system provided according to the invention;

FIG. 2 illustrates a cross section through the supply and accepted stock manifolds of the hydro-cyclone system of FIG. 1; and FIG. 3 illustrates a system schematic without an additional hydro-cyclone.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

In some embodiments provided according to the invention, at the end of at least one manifold which follows a final hydro-cyclone, a fluid or a suspension is guided via at least one flushing connection into or out of the manifold.

The medium being fed or discharged causes additional flows. Formation of dead zones and thus the threat of impurities being deposited is herewith countered in a simple manner.

For this purpose, the flushing connection may be located at the end of the manifold, either in the direction, or opposite to the direction of the main flow.

If exemplary embodiments provided according to the invention are to be implemented in the supply of the hydro-cyclones, this means that a supply manifold is provided and fibrous suspension is discharged via a flushing connection arranged at the end of the supply manifold in main flow direction of the supply manifold. In order to be able to control this on the one hand and to keep the losses as low as possible on the other hand, it may be advantageous if the fibrous suspension is returned from the flushing connection of the supply manifold—optionally via a controllable valve and a pump—back to said supply manifold, or to another supply manifold.

However, exemplary embodiments provided according to the invention can also be applied in the case of accepted stock removal. This means that an accepted stock manifold is provided and a fluid or a suspension is supplied to the accepted stock manifold via a flushing connection which is arranged at the end of the accepted stock manifold opposite to the main flow direction.

Alternatively or in addition, it may be advantageous for the purpose of influencing the intensity and/or the duration of the flushing process, if accepted stock is fed from the flushing connection which is arranged at the end of the accepted stock manifold opposite to the main flow direction of the accepted stock manifold—optionally via a controllable valve and a pump—into a supply manifold.

As there is an increased risk of deposits and consequential clogging during reject material discharge, a fluid or suspension should be supplied via a flushing connection located at the end of the reject material manifold opposite to the main flow direction of the reject material manifold.

To increase the efficiency of the system, it may be advantageous if the flushing connection of the supply manifold is connected to the feed connection of an additional hydro-cyclone. In turn, this allows the accepted stock connection of the additional hydro-cyclone to be connected to an accepted stock manifold and/or the reject material connection of the additional hydro-cyclone to be connected to a reject material manifold.

This additional hydro-cyclone provides additional flow in the vulnerable region of the manifolds while at the same time increasing the throughput of the system.

In the interest of a simple design, at least one, optionally all, manifolds are designed as a cylindrical pipe, the end of which following the final hydro-cyclone is closed off and has the flushing connection.

For an optimized flow arrangement at least some, optionally all, of the connections of the hydro-cyclones should have a nozzle extending into the corresponding manifold, which optionally progressing within the manifold, originating from the respective connection with its substantial directional component tilted or curved downward.

In some embodiments, the openings of the nozzles point downward at right angles or slightly tilted towards or opposite to the main flow direction of the respective manifold.

In the case of the supply manifold, the intake of the suspension via these nozzles counteracts deposits in the lower region of the supply manifold.

In the case of the accepted stock manifold, the accepted stock flowing in via these nozzles leads to turbulence and, if the nozzles openings point slightly in the direction of the main flow, to acceleration and thus to an overall prevention or at least reduction of deposits.

For the purpose of a simple construction it may be advantageous if the hydro-cyclones are combined in groups in such a way that the feed connections of the hydro-cyclones of a group are fed from the same supply manifold, and that the accepted stock connections of this group of hydro-cyclones lead into a common accepted stock manifold and/or the rejected material connections of this group of hydro-cyclones lead into a common rejected material manifold.

For adaptation to special requirements, it may however be equally advantageous if the hydro-cyclones are combined in groups in such a way that the feed connections of the hydro-cyclones of a group are fed from the same supply line and that at least some of the accepted stock connections of this group of hydro-cyclones lead into different accepted stock manifolds.

Referring now to the drawings, it is illustrated how the herein described hydro-cyclones 1 serve to purify a fibrous suspension, as is necessary for example to manufacture paper, having a stock density of between 1.5 and 3.5% heavy components.

The fixed housing of hydro-cyclone 1 encloses an elongated chamber having a circular cross-section.

At one end of the chamber is an inlet connection 2, through which the fibrous suspension to be purified is injected tangentially into a cylindrical inlet section of the chamber. This places the fibrous suspension on a circular path, pressing the fibrous suspension against the wall of the chamber.

Due to the effective centrifugal forces, the heavy particles accumulate on the wall of the chamber and the light particles in the center of the chamber.

In this way, the heavy particles move in a spiral manner along the wall of the chamber in the direction of flow, to the opposite end of the chamber with reject material connection 4, through which the heavy particles are discharged from hydro-cyclone 1.

To counteract blockages at reject material connection 4, dilution fluid can be fed into the chamber in the region of reject material connection 4 via a dilution fluid feed line 13.

This allows trouble-free use of hydro-cyclone 1 even with high stock consistencies.

The fibrous suspension present in the center of the chamber from which the heavy particles have been removed, is pumped off here as accepted stock via accepted stock connection 3.

For this purpose, tubular accepted stock connection 3 extends at the feed end along the center axis into the center of the chamber of hydro-cyclone 1.

The cylindrical feed section of the chamber is joined by a conical hydro-cyclone section in the direction of the opposite end, viewed in flow direction, in other words, in the direction of reject material connection 4, in which the diameter of the chamber decreases continuously towards reject material connection 4.

Due to this taper, the rotational speed of the suspension increases to such an extent that the heavy particles are concentrated on the wall of the chamber.

If, in contrast, light particles are to be removed from the fibrous suspension, the fibrous suspension purified from said particles is moved out of hydro-cyclone 1 via reject material connection 4 as a heavy particle component while the light particles are discharged via accepted stock connection 3.

As a rule, hydro-cyclones 1 used in such systems are alike. One important aspect is found in that hydro-cyclones are grouped together.

According to FIG. 1, feed connections 2, accepted stock connections 3 and reject material connections 4 of hydro-cyclones 1 of one group are connected with the same feed manifold 5, the same accepted stock manifold 6 or the same reject material manifold 7.

However, the accepted stock from one group of hydro-cyclones 1 may also be divided into different accepted stock manifolds 6 if required.

The accepted stock in accepted stock manifold 6 or in downstream tanks can be pressurized in a known manner by a vacuum device to such an extent that the suspension therein comes to a boil. This is known to be an effective way of removing the gases, especially air, contained therein.

By using so-called multi-cyclone arrangements with a large number of hydro-cyclones 1 arranged next to one another, fluctuations in volume can be evenly distributed by switching off hydro-cyclones. It may be advantageous that also in such cases the volume flow through the individual, connected hydro-cyclones 1 varies as little as possible in order to obtain an optimum result.

Of course, hydro-cyclones 1 of a system can also be multistage-connected in that the reject material of the first stage is fed as an inflow into the second stage. This reduces the fiber loss while providing good purification efficiency.

The examples in FIGS. 1 and 2 show a group of vertical hydro-cyclones 1 consisting of two parallel rows, each with several hydro-cyclones 1 arranged adjacent to one another in a row. Herein, supply manifold 5 connected with feed connections 2 of said hydro-cyclones 1 for feeding the fibrous stock suspension; and accepted stock manifold 6 connected to accepted stock connections 3 of said hydro-cyclones 1 for draining of accepted stock, as well as rejected material manifold 7 connected to rejected material connections 4 of said hydro-cyclones 1 for discharging of rejected material, progress horizontally between the two rows of hydro-cyclones 1.

All manifolds 5,6,7 herein are designed as a cylindrical, horizontally progressing pipe, wherein one end is closed and the corresponding connections 2,3,4 on the longitudinal side feed into corresponding manifold 5,6,7.

Accordingly, in FIG. 2, feed connections 2 and accepted stock connections 3 of said hydro-cyclones 1 each comprise a nozzle 12 extending into corresponding manifold 5,6 and curving downwards from respective connection 2,3 within manifold 5,6, either vertically or at a slight angle to the vertical. This improves flow conditions inside respective manifold 5,6.

Moreover, all manifolds 5,6,7 of hydro-cyclones 1 according to FIG. 1 have a flushing connection 8 at the closed end following last hydro-cyclone 1. To create turbulence, a fluid or suspension can be fed into or out of corresponding manifold 5,6,7 via these flushing connections 8.

Accordingly, flushing connection 8 is located at the end of respective manifold 5,6,7, that is, in the case of supply manifold 5 in the main flow direction; and in the case of accepted stock manifold 6 and reject manifold 7 in opposite direction to the main flow direction.

In the case of supply manifold 5, this allows a small part of the fibrous suspension to be purified to be discharged via flushing connection 8. As indicated in FIG. 3, this fibrous suspension can be returned from flushing connection 8 of supply manifold 5 via a pump 10 back into this or another supply manifold 5.

Moreover, in order to minimize dead zones, a fluid, for example dilution water or a suspension, can also be supplied to accepted stock manifold 6 via the corresponding flushing connection 8.

Alternatively, as shown in FIG. 3, it is also possible for part of the accepted stock to be returned—via a controllable valve 11 and a pump 10—from flushing connection 8 of accepted stock manifold 6 to a supply manifold 5.

Not shown is the supply of a fluid or suspension into reject material manifold 7 via its flushing connection 8.

In contrast hereto, FIG. 1 shows a solution in which an additional hydro-cyclone 9 is arranged at the closed end of manifolds 5,6,7 with flushing connections 8. Flushing connection 8 of supply manifold 5 is herein connected to feed connection 2, flushing connection 8 of the accepted stock manifold 6 is connected to accepted stock connection 3 and flushing connection 8 of reject material manifold 7 is connected to reject material connection 4 of additional hydro-cyclone 9.

Flows are generated at the closed end of the manifolds via additional hydro-cyclone 9, which counteract the deposit of impurities. The additional hydro-cyclone 9 moreover increases the purifying efficiency of the system.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for purifying a fibrous suspension, the system consisting of:
   multiple hydro-cyclones, arranged adjacent to one another in a row, each of the hydro-cyclones having at least one feed connection, one accepted stock connection and one reject material connection, and having at least one manifold comprising at least one supply manifold which is connected to multiple feed connections for the purpose of feeding the fibrous suspension and/or at least one accepted stock manifold which is connected to multiple accepted stock connections which serves to drain the accepted stock and/or at least one reject material manifold which is connected to multiple reject material connections which serves to discharge reject material, wherein the at least one manifold is elongated and the corresponding connections connected to the at least one manifold discharge at their longitudinal side into the at least one manifold, wherein at an end of the at least one manifold which follows a final hydro-cyclone in the row, a fluid or a suspension is guided via at least one flushing connection into or out of the at least one manifold; and
   an additional hydro-cyclone that is arranged at the end of the at least one manifold with the at least one flushing connection and is connected to the at least one flushing connection.

2. The system of claim 1, wherein at least one flushing connection is located at the end of the at least one manifold, either in a direction or opposite to the direction of a main flow.

3. The system of claim 2, wherein the at least one manifold comprises at least one supply manifold and fibrous suspension is discharged via the at least one flushing connection arranged at the end of the at least one supply manifold in a main flow direction of the at least one supply manifold.

4. The system of claim 3, wherein the fibrous suspension is returned from the at least one flushing connection of the at least one supply manifold back to the at least one supply manifold or to another supply manifold.

5. The system of claim 2, wherein the at least one manifold comprises at least one accepted stock manifold and a fluid or a suspension is supplied to the at least one accepted stock manifold via the at least one flushing connection which is arranged at the end of the accepted stock manifold opposite to a main flow direction.

6. The system of claim 5, wherein accepted stock is guided from the at least one flushing connection of the at least one accepted stock manifold into a supply manifold.

7. The system of claim 2, wherein the at least one manifold comprises at least one reject material manifold and a fluid or a suspension is supplied via the at least one flushing connection located at the end of the at least one reject material manifold opposite to a main flow direction of the at least one reject material manifold.

8. The system of claim 2, wherein the at least one flushing connection of the at least one supply manifold is connected to a feed connection of the additional hydro-cyclone.

9. The system of claim 8, wherein the additional hydro-cyclone comprises an accepted stock connection that is connected to the accepted stock manifold.

10. The system of claim 8, wherein the additional hydro-cyclone comprises a reject material connection that is connected to the at least one reject material manifold.

11. The system of claim 1, wherein the at least one manifold is designed as a cylindrical pipe, the end of which following the final hydro-cyclone is closed off and has the at least one flushing connection.

12. The system of claim 1, wherein at least some of the connections of the hydro-cyclones have a nozzle extending into the at least one manifold.

13. The system of claim 12, wherein the nozzles progress inside the at least one manifold originating from a respective connection progressing substantially tilted or curved downward.

14. The system of claim 1, wherein hydro-cyclones are combined in groups in such a way that feed connections of hydro-cyclones of a group are fed from the same supply manifold, and that accepted stock connections of this group of hydro-cyclones lead into a common accepted stock manifold and/or rejected material connections of this group of hydro-cyclones lead into a common rejected material manifold.

15. The system of claim 1, wherein hydro-cyclones are combined in groups in such a way that feed connections of hydro-cyclones of a group are fed from the same supply line and that at least some of the accepted stock connections of this group of hydro-cyclones lead into different accepted stock manifolds.

* * * * *